United States Patent [19]

Mitsuhashi

[11] Patent Number: 5,319,501
[45] Date of Patent: Jun. 7, 1994

[54] MAGNETIC RECORDING AND REPRODUCING APPARATUS WHICH RECORDS ANALOG TIME-BASE-COMPRESSED AUDIO SIGNALS ALONG WITH VIDEO SIGNALS

[75] Inventor: Yasuo Mitsuhashi, Nagaokakyo, Japan

[73] Assignee: Mitsubishi Denki Kabushiki Kaisha, Tokyo, Japan

[21] Appl. No.: 119,557

[22] Filed: Sep. 13, 1993

Related U.S. Application Data

[63] Continuation of Ser. No. 743,088, Aug. 9, 1991, abandoned.

[30] Foreign Application Priority Data

Aug. 17, 1990 [JP] Japan .................................. 2-216540
Aug. 21, 1990 [JP] Japan .................................. 2-220580

[51] Int. Cl.$^5$ ............................................. H04N 5/78
[52] U.S. Cl. ................................. 360/19.1; 360/36.2; 358/341
[58] Field of Search ................. 360/8, 18, 19.1, 9, 360/32, 36.1, 36.2, 7; 358/108, 343, 335, 341

[56] References Cited

U.S. PATENT DOCUMENTS

| 4,392,162 | 7/1983 | Yamamoto .......................... 360/10.3 |
| 4,763,206 | 8/1988 | Takahashi et al. ............. 360/19.1 X |
| 4,819,097 | 4/1989 | Azuma et al. ........................ 360/35.1 |
| 4,920,424 | 4/1990 | Hosaka et al. ................... 360/19.1 X |
| 4,949,173 | 8/1990 | Mitsuhashi ............................ 358/108 |
| 5,012,352 | 4/1991 | Yoshimura et al. ............ 360/19.1 X |

FOREIGN PATENT DOCUMENTS

| 0101301 | 2/1984 | European Pat. Off. . |
| 2317490 | 10/1973 | Fed. Rep. of Germany . |
| 3630374 | 4/1987 | Fed. Rep. of Germany . |

*Primary Examiner*—Andrew L. Sniezek

[57] ABSTRACT

In a magnetic recording and reproducing apparatus, audio signals are recorded over a track where video signals have been recorded. The audio signals are subject to time base compression, and are recorded on a magnetic recording medium. The audio signals undergo time base expansion before they are reproduced. When recording television signals from a plurality of channels on one magnetic recording medium or reproducing video signals intermittently, the audio signals are recorded without interruption.

14 Claims, 14 Drawing Sheets

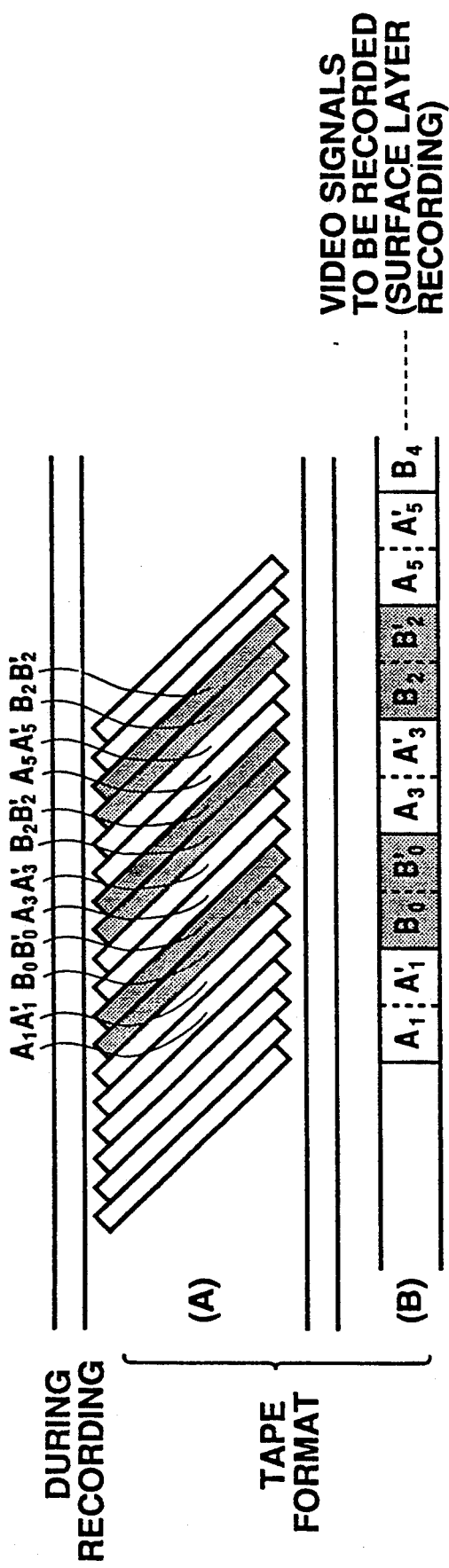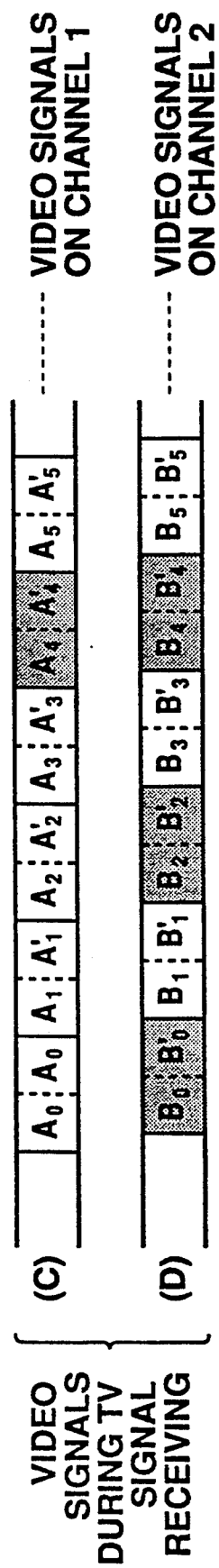
Fig. 2A
Fig. 2B

MAGNETIC RECORDING AND REPRODUCING APPARATUS WHICH RECORDS ANALOG TIME-BASE-COMPRESSED AUDIO SIGNALS ALONG WITH VIDEO SIGNALS

This application is a continuation of application Ser. No. 07/743,088 filed on Aug. 9, 1991, which is now abandoned.

BACKGROUND OF THE INVENTION

1. Field of the Invention.

This invention relates to a magnetic recording and reproducing apparatus, and more particularly, to a magnetic recording and reproducing apparatus in which video signals and audio signal television signals on a plurality of channels are recorded alternately by superimposing these signals on a recording medium, and thus a television signal of a desired channel can be selectively reproduced from the recording medium.

This invention further relates to a magnetic recording and reproducing apparatus, and more particularly, to a monitor video tape recorder which can also record audio signals over a long period of time for the purpose of crime prevention.

2. Description of the Related Arts

FIG. 12 of the accompanying drawings shows a configuration of a video tape recorder (hereinafter called "VTR") as an example of a conventional magnetic recording and reproducing apparatus.

In FIG. 12, the VTR comprises a rotary drum 10 with a non-illustrated rotary head; a head amplifier 11 for amplifying video signals read by the rotary head; a signal processing circuit 12 for demodulating the video signal amplified by the head amplifier 11; an analog-to-digital converter circuit 13 for converting the analog video signals demodulated by the signal processing circuit 12 into digital signals; a memory circuit 14 for storing an output from the analog-to-digital converter circuit 13; a digital-to-analog converter circuit 15 for converting the digital signals outputted from the memory circuit 14 into analog signals; a video signal output terminal 101 for outputting the analog video signals; a memory control circuit 16 for controlling sampling timings or timings for processing the digital signals for the analog-to-digital converter circuit 13, the memory circuit 14, and the digital-to-analog converter circuit 15; a deck sequence control circuit 17 for controlling the sequence of the whole apparatus; a special reproducing circuit 18 for controlling tape running for special reproduction such as frame hold or slow motion reproduction; a servo control circuit 19 for controlling the rotation speeds of the rotary drum 10 and a capstan motor 22 in response to the outputs from the deck sequence control circuit 17 and the special reproducing circuit 18; a capstan motor drive circuit 20 and a drum motor drive circuit 21 to be controlled by the output from the servo control circuit 19; and a capstan motor 22 to be driven by the output from the capstan motor drive circuit 20. The rotary drum 10 is driven by the output from the drum motor drive circuit 21.

Operation of the conventional VTR will now be described.

A VTR performs a reproducing operation in a mode specified by an operation panel as follows. When a tape cassette as a recording medium is loaded in the VTR, the tape is set at a predetermined position in response to a command from the deck sequence control circuit 17.

The servo control circuit 19 is actuated under the control of the deck sequence control circuit 17, driving the capstan drive circuit 20 and drum motor drive circuit 21. Then, the capstan motor 22 and rotary drum 10 are driven so as to be rotated constantly at a predetermined speed.

Video signals, which are read by the video head of the rotary drum 10 whose rotation speed and phase are controlled by the foregoing control mechanisms, are amplified by the head amplifier 11, and are demodulated to video signals from FM signals by the signal processing circuit 12.

The video signals demodulated by the signal processing circuit 12 are outputted to the video terminal 101 as they are, being inputted to a television set as ordinary video signals. Otherwise, the analog video signals are converted temporarily into digital signals by the analog-to-digital converter circuit 13 for reasons to be described later.

The digital video signals from the analog-to-digital converter 13 are stored temporarily in the memory circuit 14 including five 256-kb RAMs, converted into analog signals by the digital-to-analog converter circuit 15, and outputted to the video signal output terminal 101 as analog signals.

Needless to say, the number of bits and memory capacity for analog-to-digital conversion can be determined as desired. To prevent deterioration of image quality, a six-bit analog-to-digital converter, a six-bit digital-to-analog converter and a memory having five 256-kb RAMs are necessary. When the frame memory system is adopted as a recording system, it is known that memory capacity twice as large as that for the field memory system is necessary.

The signals are processed digitally by the memory control circuit 16, which performs sampling with a 14-MHz clock frequency and includes a gate array having 3,000 to 4,000 gates.

Generally speaking, it is not always necessary to operate the analog-to-digital converter circuit 13, memory circuit 14, digital-to-analog converter 15 and memory control circuit 16 during reproduction. They are however used to perform a special reproducing operation such as freeze frame or slow motion reproduction. Drive control by the special reproducing circuit 18 and operation of the memory control circuit 16 recall the contents of the memory circuit 14, thereby offering an excellent still or slow motion image.

Specifically, when stopping the tape from running or having the tape run intermittently, the video signals are stored in the memory circuit 14 serving as a field memory while field-reproducing the video signal, thereby providing a good still or slow motion image.

With the conventional VTR as described above, TV signals for only one channel are recorded at a time. Two VTRs must be used to record TV signals on two channels simultaneously.

In addition, since the memory circuit is used only for still or slow motion operation, demands to use the memory circuit more effectively during reproducing have increased.

There is an intermittent recording type of VTR in which the video signals are sampled so as to be recorded and reproduced intermittently. Such a VTR cannot record audio signals but records only the video signals in frames (or fields) intermittently.

FIGS. 13 to 15 show the conventional VTR for intermittent recording.

In FIG. 13, reference numeral 201 stands for a video signal amplifier for receiving video signals from a TV camera at a high impedance, 202 a video signal reproducing circuit including an FM modulator for modulating the video signals into FM signals, 203 an FM signal amplifier for amplifying the FM signals, 204 a mode selector switch for selecting the recording or reproducing mode, 205 a video signal reproducing circuit including an FM demodulator for demodulating the FM signals detected from a magnetic tape at the time of reproducing, 206 an intermittent drive circuit for feeding the magnetic tape intermittently, 300 a rotary drum having two video heads VR and VL, 301 a magnetic tape running to a predetermined extent around the rotary drum 300, 302 a capstan shaft for feeding the magnetic tape 301, and 303 a pinch roller adapted to rotate together with the capstan shaft 302 with the magnetic tape 301 sandwiched between them.

In operation, upon passing through the video signal amplifier 201, video signal reproducing circuit 202 and FM signal amplifier 203, the video signals are converted into FM signals, and applied to the video heads VR, VL on the rotary drum 300 via the mode selector switch 204.

As shown in FIG. 14(a), TV signals from a TV camera include fields $V_0, V_1, \ldots V_9, V_{10}, V_{11}, V_{12}, \ldots$ in succession. When these fields are recorded successively on the magnetic tape 301, an existing VTR for intermittent recording and reproducing records the fields for a maximum of only eight hours. If every two fields are recorded intermittently, for example, a VTR can perform recording up to 160 hours (8 hours×40/2).

For this purpose, not only the magnetic tape 301 should be fed intermittently but also video tracks to be recorded intermittently on the magnetic tape 301 should be obliquely adjacent to one another in succession as shown in FIG. 15.

Therefore, intermittent drive pulse signals are generated based on vertical synchronizing signals by the intermittent drive circuit 206. The pulse signals are applied to a non-illustrated capstan motor drive circuit, so that the magnetic tape 301 is fed accurately to a predetermined extent by intermittent rotation of the capstan shaft 302 and the pinch roller 303, as shown in FIG. 14(b).

The foregoing operation enables the signals to be written on the magnetic tape 301 by the video heads VR, VL of the rotary drum 300. In an ordinary VTR, since both video heads VR and VL have a narrow head gap of 0.25 μm, recording is performed only on a surface layer of the magnetic tape 301.

During reproduction, the FM signals detected by the video heads VR, VL from the magnetic tape 301 are demodulated by the video signal reproducing circuit 205, thereby producing the video signals.

The foregoing VTR of the intermittent recording and reproducing type is composed so as to have the magnetic tape fed intermittently. Therefore, no audio signal has been recorded, by using a stationary head, on the upper edge (linear audio track) of the magnetic tape since the magnetic tape is on standby for about 0.63 seconds.

When the audio signals are recorded by the VHS-HiFi system of the deep layer recording type in timed relation with intermittent recording of the video signals, the video signals sampled at 1/20 can be read as data while the audio signal sampled at 1/20 cannot be read at all.

With the foregoing VTR, recording of the audio signals has to be sacrificed. Unfortunately such a VTR is inconvenient when it is applied as a monitor unit in a burglar alert system, since no sound (voice) can be recorded.

SUMMARY OF THE INVENTION

It is an object of this invention to provide a magnetic recording and reproducing apparatus in which video signals and audio signals of asynchronous television signals for a plurality of channels are superimposed alternately on a recording medium, and television signals on a desired channel can be reproduced.

Another object of this invention is to provide a novel magnetic recording and reproducing apparatus of an intermittent recording and reproducing type, in which the video signals are sampled on their time base so as to be written on the magnetic recording medium in succession while the audio signals are not sampled but superimposed on the same recording medium in succession.

According to a first aspect of this invention, there is provided a magnetic recording and reproducing apparatus comprising: (a) analog-to-digital converters for converting audio signals into digital data; (b) a memory for storing the data outputted from the analog-to-digital converters; (c) time base compressors for compressing the time base of the data stored in the memory and outputting the time-base-compressed data; (d) a digital-to-analog converter for converting the data outputted from the time base compressor into analog signals and outputting them as time-base-compressed audio signals; (e) an audio signal recorder for recording the time-base-compressed audio signals on a recording medium; and (f) a video signal recorder for superimposing the video signals on the magnetic recording medium over the area where the time-base-compressed audio signals have been recorded.

With this arrangement, the magnetic recording and reproducing apparatus records the audio and video signals on the magnetic recording medium as follows. Firstly, the audio signals are received by analog-to-digital converters while the video signals are received by the video signal recorders. The analog-to-digital converters convert the audio signals into digital data, supplying the digital data to the memory, which stores the data. The data stored in the memory are applied to the audio signal recorder via the time base compressor and digital-to-analog converters. Both the audio signal recorder and the video signal recorder record the audio signals and video signals respectively on the magnetic recording medium in areas assigned to these signals. The video signals are superimposed on the magnetic recording medium over the area where the audio signals are recorded.

In this case, the video signals to be recorded on the magnetic recording medium by the video signal recorder may be intermittent similar to those for recording television signals of multiple channels or those for intermittent recording. Specifically, when signals in a first field have been recorded, signals in a third field may be recorded by skipping signals in a second field, for example. Even when intermittently recorded video signals are reproduced, no inconvenience will be caused to viewers. On the contrary, audio signals which are reproduced intermittently may irritate listeners.

To overcome this inconvenience, the audio signals undergo time base compression and are recorded on the magnetic recording medium. For this purpose, the apparatus of this invention includes the time base compressor.

The time base compressor compresses the time base of the data read from the memory, supplying the data to the digital-to-analog converter. The data supplied to the digital-to-analog converter are recorded on the magnetic recording medium as audio signals (hereinafter called "time-base-compressed audio signals" since the time base of the signals has been compressed). Since the time base of the audio signals is compressed, audio signal data can be stored on the magnetic recording medium without interruption.

The technique for recording the audio signal data is a contributary factor in solving problems with the related art apparatus. For example, this technique enables the magnetic recording and reproducing apparatus to be composed so that audio signals on a plurality of channels can be recorded on the magnetic recording medium and be reproduced continuously so as to offer sounds without interruption. In addition, the audio signals can be recorded on a monitor VTR over a long period of time, for example.

When this invention is applied to a magnetic recording and reproducing apparatus having a multichannel recording function, the magnetic recording and reproducing apparatus comprises: (a) "n" input units for inputting television signals including audio signals as well as video signals (where n is an integer larger than 2); (b) a predetermined number of analog-to-digital converters for the video signals, said analog-to-digital converters being adapted to convert video signals inputted from said "n−1" input units digital data and outputting the digital data; (c) a predetermined number of analog-to-digital converters for the audio signals, the analog-to-digital converters being adapted to convert the audio signals inputted respectively from a plurality of input units into digital data; (d) a memory for storing the data outputted from the analog-to-digital converters for both the video signals and the audio signals; (e) digital-to-analog converters for the video signals, the digital-to-analog converters being adapted to convert the data outputted from the analog-to-digital converter for the video signals and stored in the memory into analog signals and to output the analog signals as "n−1" video signals; (f) a time base compressor for compressing the time base of the data outputted by the analog-to-digital converter for the audio signals and stored in the memory, and for outputting the time-base-compressed data; (g) digital-to-analog converters for the audio signals, the digital-to-analog converters being adapted to convert the data outputted from the time base compressor into analog signals and for outputting the analog signals as time-base-compressed audio signals; (h) an audio data supply control unit for controlling the timing for the time base compressor supplying the data to the digital-to-analog converter for the audio signals so that data corresponding to the audio and video signals inputted from the "n" input units, are incorporated alternately into the time-base-compressed audio signals outputted from the digital-to-analog converter for the audio signals; (i) an audio signal recorder for recording the time-base-compressed audio signals on a magnetic recording medium; (j) a video signal recorder for superimposing "n−1" video signals inputted from the digital-to-analog converter for the video signals and one video signal not inputted to the analog-to-digital converter for the audio signals over the area where the time-base compressed audio signals are recorded on the magnetic recording medium; and (k) a video signal supply control unit for supplying "n" video signals alternately at a predetermined timing so as to have "n" video signals recorded by the video signal recorder.

With the second arrangement of the invention, video signals for "n−1" channels are stored in the memory as digital data. The digital data undergo digital-to-analog conversion and are recorded on the magnetic recording medium at a timing synchronized with the one remaining video signal. In other words, since the "n" inputted video signals are usually asynchronous with one another, they should be synchronized by a suitable means so as to record the video signals on the magnetic recording medium. The "n−1" video signals are stored temporarily in the memory, and are read from the memory at an appropriate timing by using the one remaining one video signal as a reference for synchronization, so that the video signals are recorded on the magnetic recording medium.

There are also audio signals for "n" channels. The audio signals have to be recorded so that they can be reproduced without interruption. Therefore, the inputted audio signals undergo analog-to-digital conversion before being stored temporarily in the memory as digital data. The digital data are read from the memory, are subject to time base compression at an appropriate compression rate, and are converted into analog data so as to be recorded on the magnetic recording medium. The data recorded on the magnetic recording medium includes the audio data for all the channels, thereby allowing continuous reproduction of the audio signals.

Thus the magnetic recording and reproducing apparatus with the multi-channel reproducing function can be realized.

With the second arrangement, a plurality of memory may be provided for the audio signals and the video signals. Preferably the memory comprises a video signal memory and a predetermined number of audio signal memories. In this case, the video signal memory stores the data outputted from the analog-to-digital converters for the video signals while the audio signal memories store data outputted from corresponding analog-to-digital converters for the audio signals.

Similarly a plurality of time base compressors may be provided according to the number of audio signals. Each time base compressor compresses the time base of the audio signals stored in the audio signal memories, and outputs the compressed data.

Preferably, the audio signals and the video signals are recorded on the same track of the magnetic recording medium. Specifically, the audio signal recorder records the time-base-compressed audio signals on the magnetic recording medium in an area at a predetermined depth. On the other hand, the audio signal recorder superimposes the video signals over the area where the time-base-compressed audio signals have been recorded. This recording can be performed by a pair of recording heads disposed on the circumferential surface of the rotary drum. "Superimposing" can be performed by mixing the time-base-compressed audio signals into the video signals, or can be carried out by so-called multi-layer recording. In the latter case, the video signals and the audio signals are recorded respectively on the magnetic recording medium in areas having different depths. For instance, the audio signal recorder records the time-base-compressed audio signals on the magnetic recording medium in an area at a predetermined depth from the surface thereof. Then the video signal recorder records the video signals on the magnetic recording medium at a different depth over the area where the audio signals have been recorded by the audio signal recorder.

The magnetic recording and reproducing apparatus with the multi-channel recording function further includes the reproducing units as follows: (a) a video signal reproducer for reproducing "n" video signals stored on the magnetic recording medium; (b) a video signal selector for selecting any of "n" reproduced video signals and outputting the selected signals as reproduced video signals; (c) an audio signal reproducer for reproducing the time-base-compressed audio signals stored on the magnetic recording medium; (d) an audio signal selector for selecting, from the time-base-compressed audio signals, elements corresponding to any of "n" audio signals inputted from different input units, and outputting the selected elements to the analog-to-digital converter for the audio signals; and (e) a time base expander for expanding the time base of the data stored in the memory and outputted by the analog-to-digital converters for the audio signals, releasing the data from time base compression, and outputting the data to digital-to-analog converters for the audio signals, the digital-to-analog converters for the audio signals being adapted to convert the signals outputted from said time base expander into analog signals and to output them as reproduced audio signals.

The apparatus according to a third aspect of this invention has a function to expand the time base of the time-base-compressed audio signals and to reproduce the time-base-expanded audio signals as well as the function to reproduce the video signals. This time base expansion is performed only on the audio signals for a desired channel. In the foregoing arrangement, the time-base-compressed audio signals are stored temporarily in the memory as digital data. Then, the time-base-compressed audio signals for a desired channel are selectively subject to the time base expansion.

Thus the magnetic recording and reproducing apparatus can reproduce the time-base-compressed audio signals in an optimum manner so as to assure continuous audio outputs.

In addition, the video signals may be stored temporarily in the memory when they are reproduced.

According to a fourth aspect of this invention, there is provided a long playing monitor VTR with an audio signal reproducing function, comprising: (a) analog-to-digital converters for converting audio signals into digital data; (b) a memory for storing data outputted from the analog-to-digital converters; (c) a time base compressor for compressing the time base of the data stored in the memory; (d) digital-to-analog converters for converting the data outputted from the time base compressor into analog signals and outputting them as time-base-compressed audio signals; (e) an audio signal recorder for recording the time-base-compressed audio signals on a magnetic recording medium; (f) a video signal recorder for superimposing video signals on the magnetic recording medium over the area where the video signals have been recorded; and (g) an intermittent recording control unit for having the video signal recorder record the video signals intermittently at a predetermined time interval and having the audio signal recorder record the time-base-compressed audio signals corresponding to the predetermined time interval.

With this arrangement, the audio signals undergo time base compression and are recorded on the magnetic recording medium in a similar manner to the multi-channel signal recording. Therefore, the audio signals can be recorded over a long period of time in a magnetic recording and reproducing apparatus which has to perform intermittent recording to meet a demand of prolonged recording by a monitor VTR, for example.

According to the fifth aspect of this invention, the time-base-compressed audio signals and the video signals are recorded on the magnetic recording medium in their associated layers.

The audio signals and the video signals recorded as described above will be reproduced by a magnetic recording and reproducing apparatus which comprises: (a) a video signal reproducer for reproducing the video signals stored on the magnetic recording medium and outputting the reproduced video signals; (b) an audio signal reproducing unit for reproducing the time-base-compressed audio signals stored on the magnetic recording medium and outputting the reproduced audio signals to the analog-to-digital converters; and (c) a time base expander for expanding the time base of the time-base-compressed audio signals stored in said memory and reproduced by the audio signal reproducing unit so as to release time base compression, and outputting the audio signal to the digital-to-analog converters, the digital-to-analog converter being adapted to convert the audio signals outputted from the time base expander into analog signals and output them as reproduced audio signals.

BRIEF DESCRIPTION OF THE DRAWINGS

FIG. 2A shows a tape format of the apparatus of the first embodiment;

FIG. 2B is a diagram showing video signals during reception of a TV signal in the apparatus of the first embodiment;

DETAILED DESCRIPTION

A magnetic recording and reproducing apparatus of a first embodiment of this invention will now be described with reference to FIGS. 1 to 6.

Figure 1:
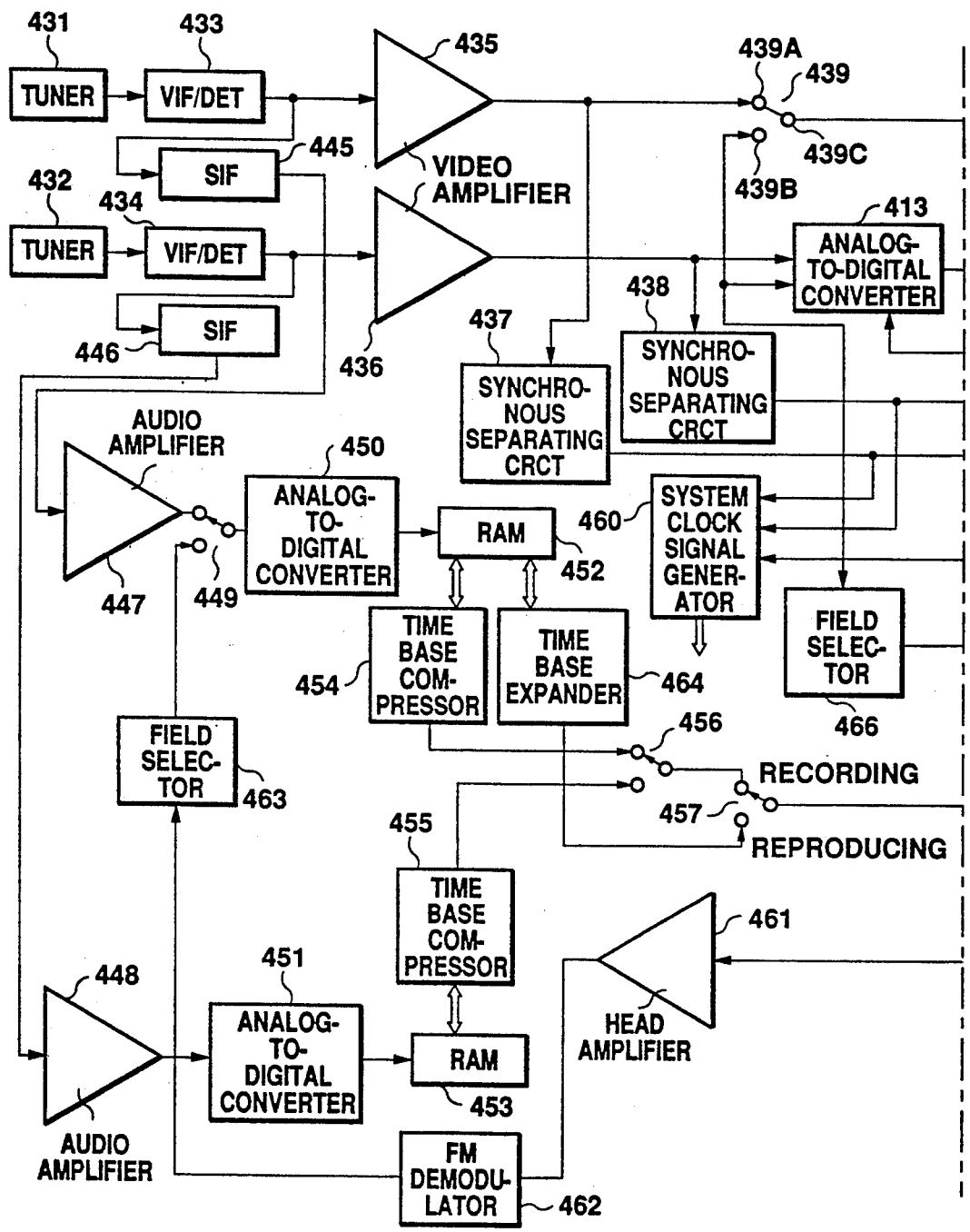
FIG. 1 is a block diagram showing a configuration of a magnetic recording and reproducing apparatus according to a first embodiment of this invention.
Figure 1:
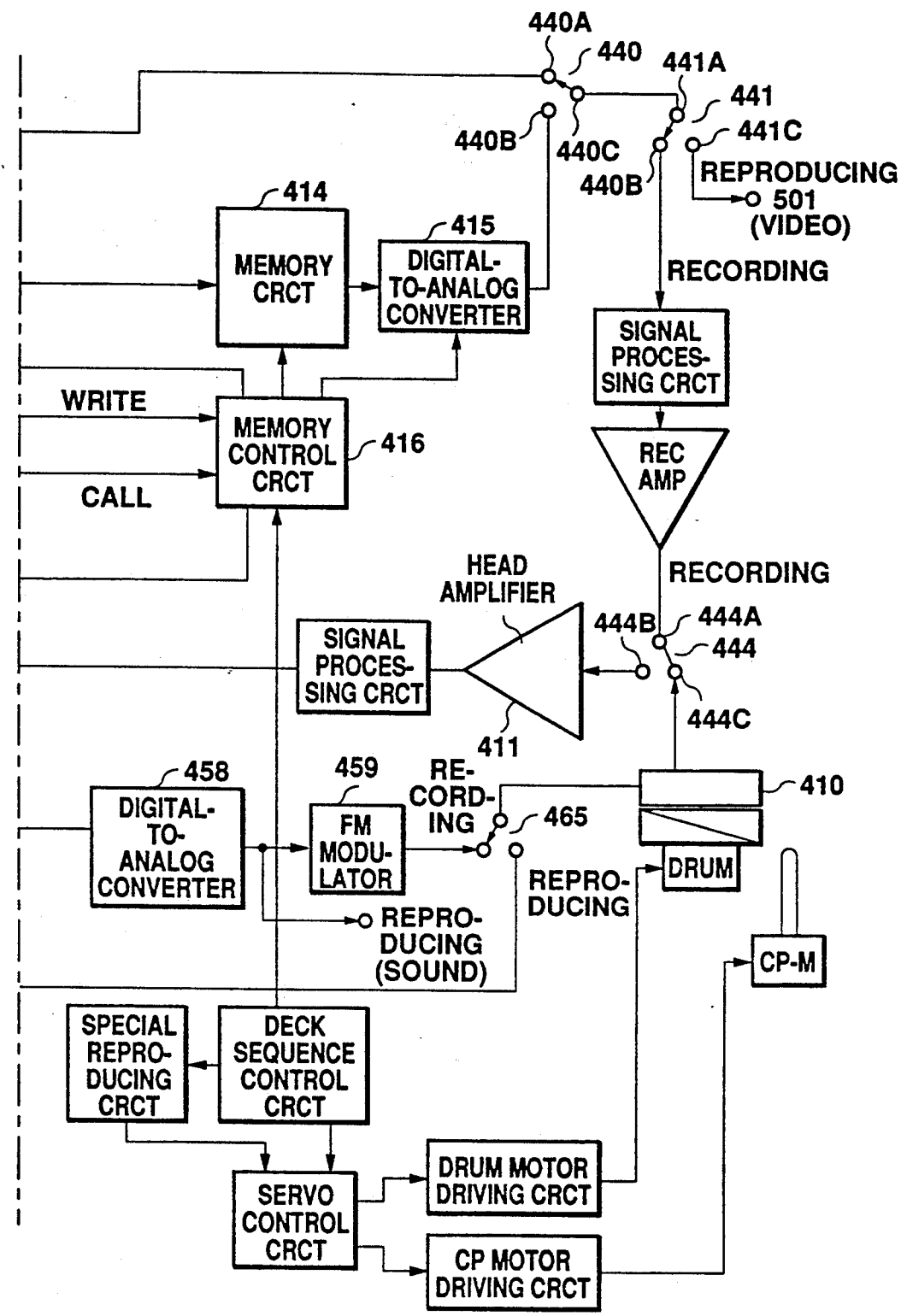

As shown in FIG. 1, the magnetic recording and reproducing apparatus comprises tuners 431, 432; video IF amplifier.detectors 433, 434; video amplifiers 435, 436; synchronous separation circuits 437, 438; selector switches 439, 440, 441, 444, 449, 456, 457 and 456; a signal processing circuit 442; a reproducing amplifier 443; audio IF amplifier.detectors 445, 446; audio amplifiers 447, 448; analog-to-digital converter circuits 450, 451; RAMs 452, 453; time base compressors 454, 455; a digital-to-analog converter circuit 458; an FM modulator 459; a system clock signal generator 460; a head amplifier 461; an FM demodulator 462; field selector circuits 463, 466; and a time base expanding circuit 464. The other components are identical to those of the conventional apparatus shown in FIG. 12.

In operation, reproducing is performed by this magnetic recording and reproducing apparatus as described below.

In FIG. 1, the tuners 431, 432 shown in FIG. 1 receive TV signals through different channels. It is assumed that the tuner 431 is receiving a TV signal for channel 1 while the tuner 432 is receiving another TV signal for channel 2.

The video signals received by the tuners 431, 432, respectively, are outputted to the video amplifiers 435, 436 through the video IF amplifier.detectors 433, 434.

The output from the video amplifier 435 is applied to a stationary terminal 439A of the selector switch 439, being outputted to the synchronous separation circuit 437.

The output from the video amplifier 436 is sent to the synchronous separation circuit 438 as well as to the analog-to-digital converter circuit 413.

The synchronous separation circuits 437, 438 sample synchronous signals from the video signals amplified by the video amplifiers 435, 436, shaping the synchronous signals, and outputting these signals to the memory control circuit 416. The synchronous signals are used as control signals by the memory control circuit 416. Specifically, the synchronous signal from the synchronous separation circuit 437 is used as a read signal while the synchronous signal from the synchronous separation circuit 438 is used as a write signal.

The video signals amplified by the video amplifier 435 are inputted to the stationary terminal 440A of the selector switch 440 via the selector switch 439. On the other hand, the video signals amplified by the video amplifier 436 are inputted to the stationary terminal 440B of the selector switch 440 via the analog-to-digital converter circuit 413, the memory circuit 414 and the digital-to-analog converter circuit 440.

It can be seen that the selector switch 440 is used for selecting either the video signal for channel 1 outputted from the video amplifier 435 via the movable terminal 439C of the selector switch 439 or the video signal for channel 2 inputted by the digital-to-analog converter circuit 415 and undergoing digital processing. Therefore the movable terminal 440C of the selector switch 440 outputs either the video signal for channel 1 or that for channel 2 depending upon the operation of the selector switch 440.

The movable terminal 440C of the selector switch 440 is connected to the stationary terminal 441A of the selector switch 441. The stationary terminal 441C of the selector switch 441 is connected to the video signal output terminal 501 while the stationary terminal 441B is connected to the stationary terminal 444A of the selector switch 444 via the signal processing circuit 442 and recording amplifier 443.

During recording, the selector switch 444 has both the movable and stationary terminals 441A and 441B interconnected. The video signals, which are outputted from the movable terminal 440C for channels and 2, are modulated to FM signals by the signal processing circuit 441, before being outputted to the recording amplifier 443. The recording amplifier 443 amplifies the FM recording signals, outputting the signals to the stationary terminal 444A of the selector switch 444.

The stationary terminal 444B of the selector switch 444 is connected to an input terminal of the head amplifier 411 while the movable terminal 444C is connected to the rotary drum 410.

The foregoing recording operation will be described in detail with reference to the tape format shown in FIG. 2.

Firstly, the tuners 431 and 432 are receiving TV signals for different channels. The outputs from the tuners 431 and 432 are outputted to the video amplifiers 435 and 436 via the video IF amplifier.detectors 433, 434. Therefore the video signals outputted by the video amplifiers 435, 436 have data on different synchronization signals and image signals.

For simplification, the received signals are shown at (C) and (D) in FIG. 2(B) in correspondence with the tape format shown in FIG. 2A. In FIG. 2(B), An and An' stand for the odd-numbered video signal fields and even-numbered video signal fields respectively on channel 1.

Similarly Bn and Bn' stand for the odd-numbered video signal fields and even-numbered video signal fields respectively on channel 2.

It can be seen from FIG. 2(B) that the video signals on channels 1 and 2 are asynchronous.

The video signals including the different synchronization signals and different image signals are recorded as described below.

Firstly, the video signals B0, B0' for channel 2 are written into the memory circuit 414 via the analog-to-digital converter circuit 413 by actuating the memory control circuit 416 according to the synchronization signal separated by the synchronous separation circuit 438. In other words, the synchronous separation circuit 438 separates a synchronization signal from the image signals amplified by the video amplifier 436. The separated synchronization signal is applied to the memory control circuit 416 to be used for controlling the write timing in the memory control circuit 416. According to this timing control signal, the memory control circuit 416 controls the analog-to-digital converter circuit 413 and the memory circuit 414. This means that the image signals amplified by the video amplifier 435 are converted into digital signals by the analog-to-digital converter circuit 413, before being written into the memory circuit 414.

As for the video signals inputted from channel 1, first video signals A0, A0' are ignored. Second video signals A1, A1' are applied to the signal processing circuit 442 by the selector switches 439, 440, 441 as described before. The signal processing circuit 442 modulates the image signals into FM signals, which are then amplified by the recording amplifier 443, being outputted to the rotary drum 410 via the selector switch 444. The signals A1, A1' are recorded on the magnetic tape in a similar manner to those in the conventional VTR (refer to (B) in FIG. 2A).

After writing the signals A1, A1' on the magnetic tape, the video signals B0, B0' for channel 2 are transmitted, by the memory circuit 414, to the selector switch 440 via the digital-to-analog converter circuit 415 according to the synchronization signal for channel 1. These signals are then inputted to the signal processing circuit 412 via the selector switch 441, and are inputted to the video head of the rotary drum 443 via the recording amplifier 443 and selector switch 444, so that the signals are recorded on the magnetic tape.

The timing for recalling the signals stored in the memory circuit 414 is controlled by the memory control circuit 413 based on the synchronization signal for channel 1 separated by the synchronous separation circuit 437. Therefore, the signals A1, A1', B0, B0' are recorded successively in the named order on the tape by the operation of the memory circuit 414 and digital-to-analog converter circuit 415, as shown at (B) in FIG. 2A.

The foregoing operations are repeated alternately for the video signals for channels 1 and 2. As shown at (B) in FIG. 2A, the video signals for channel 1 are skipped in every two frames, and the video signals for channel 2 are recorded alternately in every two frames. Although it seems as if the signals for only channel 1 are recorded on the tape in view of the tape format, the signals for the two channels are actually recorded alternately in the respective frames.

The selector switches 439, 441 and 444 are used for selectively operating the video head in either the recording or reproducing mode. During the foregoing operation, these selector switches are set in the recording mode positions.

Operation of the audio signal system will now be described.

Firstly, the audio signals outputted from the audio IF amplifier.detectors 445, 446 are applied to the audio amplifiers 447, 448. The selector switch 449 selects either the recording or reproducing mode for the audio signals. The analog-to-digital converter circuits 450, 451 convert the analog audio signals into digital signals. RAMs 452, 453 store the digital audio signals temporarily. The time base compressors 455, 456 compress the time base of the audio signals stored in RAMs 452, 453. The selector switch 456 is actuated only for the recording mode, selecting a video signal field. The selector switch 457 selects either the recording mode or the reproducing mode. The digital-to-analog converter circuit 458 converts the digital audio signals, which have been compressed by the time base compressor 454, into analog audio signals. The FM modulator 459 modulates the compressed digital audio signals into FM signals. The system clock signal generator 460 controls the sequence for processing the foregoing audio signals, and is actuated according to the signals outputted from the synchronous separation circuits 437, 438 and the memory control circuit 416.

Operation for recording the audio signals will now be described in detail.

Different audio signals received by the tuners 431, 432 are detected by the audio IF amplifier.detectors 445, 446, and then amplified by the audio amplifiers 447, 448. The analog signals amplified by these amplifiers are converted into digital audio signals by the analog-to-digital converter circuits 450, 451.

According to the sampling theorem to express continuous analog signals by sampling them at a predetermined time interval, when sampling is performed at at least twice the maximum frequency in the signal spectrum distribution, original waveforms can be reproduced completely. In addition, audio signals can be identified when they have a frequency of 10 KHz. In this case, a sampling frequency of 20 KHz is enough to correctly reproduce the audio signals.

Analog audio signals including frequencies up to 10 KHz maximum, sampled at a frequency of 20 KHz, are quantized by eight bits, for example, and are written into RAMs 452, 453. The digital audio signal written into RAMs 452, 453 are read by using a frequency which is ten times the sampling frequency (200 KHz). This means that the time base of the signal is compressed to one tenth.

The time base compressors 454, 455 write the foregoing digital signals into RAMs 452, 453 temporarily at a predetermined speed, reading the signals at a higher speed. For example, a data transmitting rate (the predetermined speed described above) is determined to be 10 KHz×8 bits=80 kbps. The 80 kbps data should be read at a tenfold speed so as to compress the time base of the data to one tenth. Specifically, the data in RAMs are read at a high speed of 0.8 mbps (=80 kbps×10) so as to be time-base compressed. The digital signals are applied to the digital-to-analog converter circuit 458 via the selector switches 456, 457, and are sent to the FM modulator circuit 459 as time-base-compressed analog signals to be modulated and amplified. The signals are then forwarded to a deep layer recording head of the rotary drum 410 via the mode selector switch 465, to be recorded on the tape.

The selector switch 456 is for selecting alternately signals outputted from either of the time base compressors 454, 455 for each audio signal frame. The time-base-compressed digital audio signals for channels 1 and 2 are alternately transmitted to the output of the selector switch 456.

The system clock signal generator circuit 460 controls the timing of the digital signals. Various clock signals are generated by the system clock signal generator circuit 460 based on the synchronization signals in the video signals and burst signals in chromatic signals.

Recording of the audio signals will be described similarly to the foregoing video signals with reference to FIGS. 2A to 2B showing the tape format.

Figure 2C:
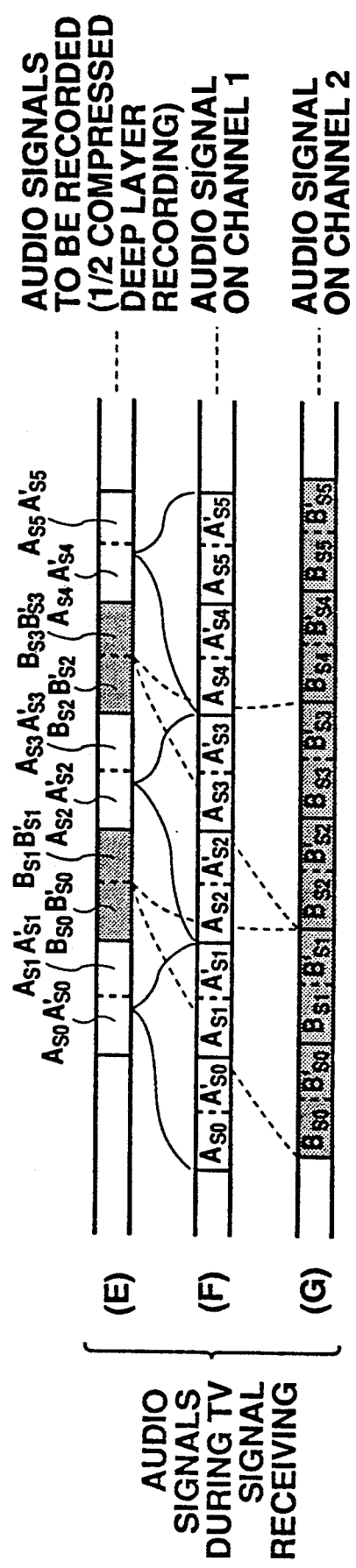
FIG. 2C is a diagram showing audio signals during reception of the TV signal in the apparatus of the first embodiment.

As shown in FIGS. 2A and 2B, the video signals A1A1', B0B0', A3A3', B2B2', ... for the two channels are recorded in each channel frame successively, continuously and alternately by skipping the data in every two frames for the two channels. Different audio data signals for the two channels are sent in succession in the order of As0, AS0', As1, As1', As2, Bs0, Bs0', Bs1, Bs2, . . . . The analog audio signals are sent in succession without reference signals. For simplification, each frame for the audio signals is sectioned similarly to the video signals as shown at (F) and (G) of FIG. 2C.

These analog audio signals are inputted respectively to the analog-to-digital converter circuits 450, 451 so as to be converted into 8-bit digital signals. These 8-bit digital signals are stored in their associated RAMs 452, 453, and are compressed by their associated time base compressors 454, 455. The compressed audio signals are assigned to the respective channels by the selector switch 456 for selecting the frames, being applied to the switch 457. The audio signals are recorded continuously on the tape by switching them in every frame for the two channels. Only with the present embodiment, the audio signals are recorded on the tape as shown at (E) in FIG. 2C. It is only necessary to compress the audio signals to half in the time base compressors 454, 455. It is however preferable to compress the audio signals to about one tenth so as to be applicable when there are three or more channels.

The compressed digital audio signals are reconverted into analog audio signals by the digital-to-analog converter circuit 458, are modulated into FM waves by the FM modulator circuit 459 for the VHS system, and are forwarded via the selector switch 465 to the rotary drum 410 so as to be subject to deep layer recording by an audio-signal-only head of the rotary drum 410.

Figure 3:
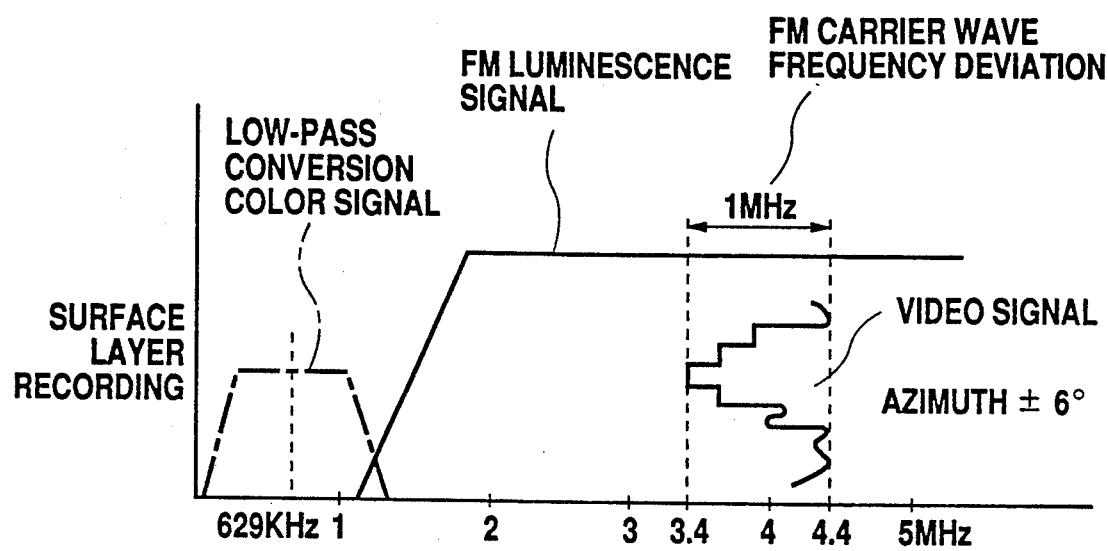
FIG. 3 shows details of surface layer recording in the apparatus of the first embodiment.

As shown at (F) and (G) in FIG. 2C and at (E) in FIG. 3, the audio signals for the two channels are compressed to half, before being recorded on the deep layer of the tape.

The method for recording the video signals, which are switched for every frame, and the half-compressed audio signals will be now described with reference to FIGS. 3 to 6 showing the principle of the superimposition recording system adopted in this invention.

Figure 4:
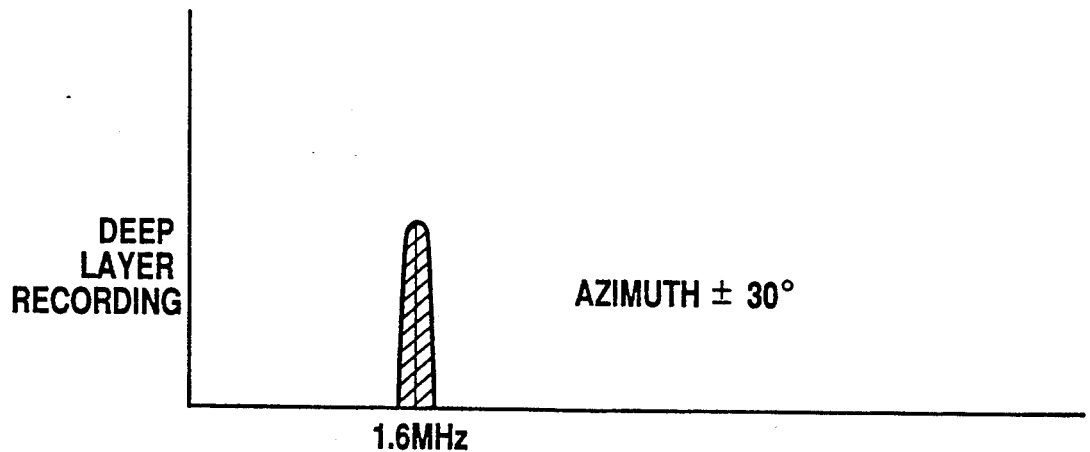
FIG. 4 shows details of deep layer recording in the apparatus of the first embodiment.

Firstly, as shown in FIG. 3, a luminescence signal and a chromatic signal in the video signals are modulated according to the FM carrier wave modulation system and the direct low-pass conversion reproducing system, respectively, and are recorded by the video reproducing head (having an azimuth angle of plus/minus 6° with the VHS system). On the other hand, the audio signals are subject to the FM modulation at frequency as shown in FIG. 4, and are recorded by the audio head (having an azimuth angle of plus/minus 30° with the VHS system).

Figure 5:
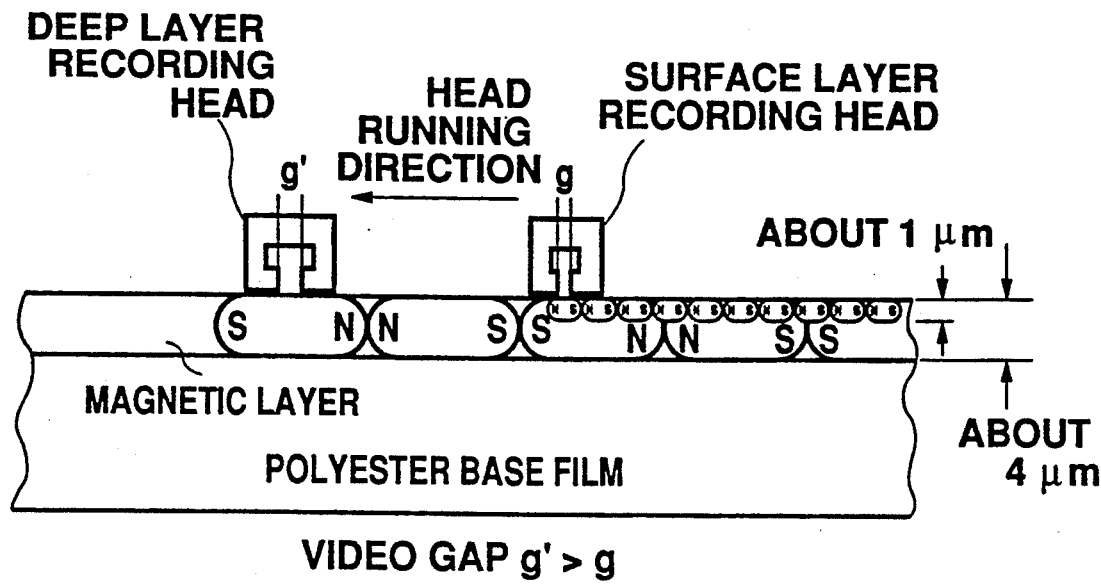
FIG. 5 is a cross sectional view showing details of double layer recording in the apparatus of the first embodiment.
Figure 6:
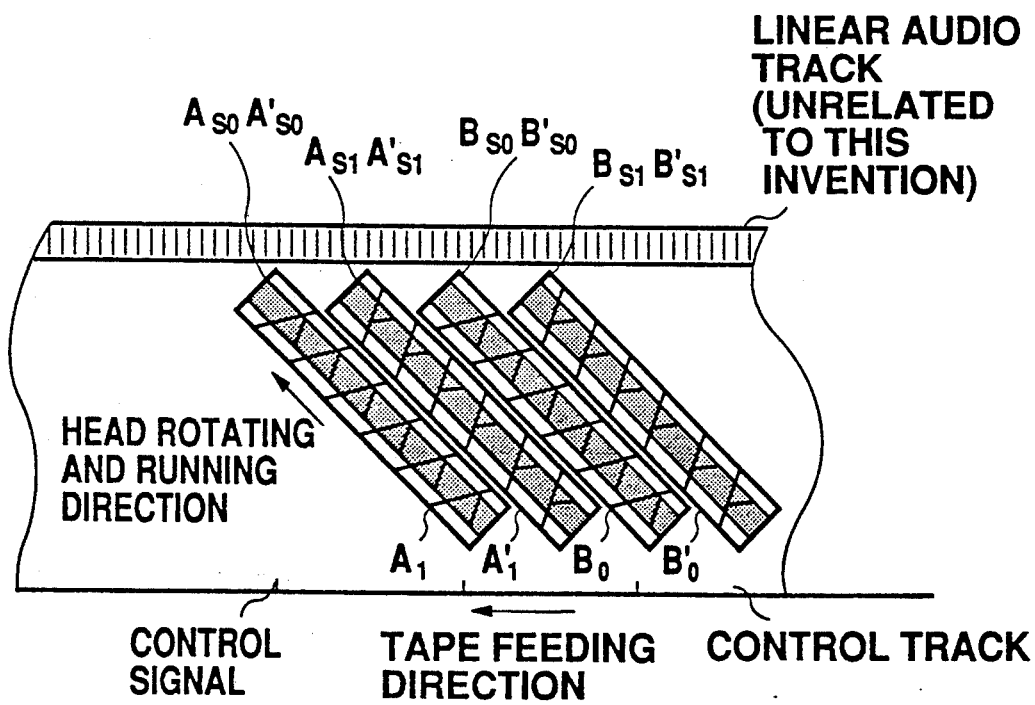
FIG. 6 is a top plan view showing details of the double layer recording in the apparatus of the first embodiment.

FIG. 5 is a cross sectional view of the tape showing the manner for recording the video and audio signals. FIG. 6 shows the recording of the signals viewed from the magnetic layer. It can be seen that the audio signals are written once on one track by one head in the direction of depth of the tape and that the video signals are written similarly to the audio signals, i.e., writing is performed two times by the two heads on one track.

The video signals will be reproduced as described below.

The video signals read by the rotary drum 410 are applied to the head amplifier 411, via the selector switch 444, and amplified, being inputted to the signal processing circuit 412 so as to be demodulated therein. An output of the signal processing circuit 412 is inputted into the field selector 466. The field selector 466 selects one of the frames in which the video signals for the two channels are arranged alternately. The video signals selected by the field selector 466 are applied not only to the analog-to-digital converter circuit 413 but also to the stationary terminal 439B of the selector switch 439. The selector switch 439 serves to select either the recording mode or reproducing mode for the non-illustrated video head of the rotary drum 410, having its movable terminal 439C connected to the stationary terminal 440A of the selector switch 440.

As for the audio signals, the FM audio signals read by the rotary drum 410 are inputted to the head amplifier 461 via the selector switch 465. The audio signals amplified by the head amplifier 461 are outputted to the FM demodulator circuit 462, which demodulates the FM audio signals. The field selector 463 selects one of the frames in which the audio signals for the two channels are arranged alternately. The audio signal selected by the field selector 463 is a signal whose time base is compressed, and is expanded by the time base expander 464.

The foregoing embodiment relates to the TV signals for the two channels. It is clearly understood that TV signals for three or more channels can be recorded similarly. It is however inevitable that the more channels there are, the poorer the frame or field resolution for the video signals will become.

The memory circuit 414 may be either a field or frame memory. Whoever, when the recording and reproducing operations are performed for each frame as shown in FIGS. 2A to 2C, the frame memory should be used, in which twice as many RAMs should be provided as for the field memory.

In the foregoing description, although the clock signal frequencies are changed for RAMs 452, 453 to compress the time base of the audio signals, time base compression can be also carried out by the bit conversion system.

In addition, the audio signals may be modulated by the QPSK modulation system. In such a case, the digital-to-analog converter circuit 458 is dispensable.

Figure 12:
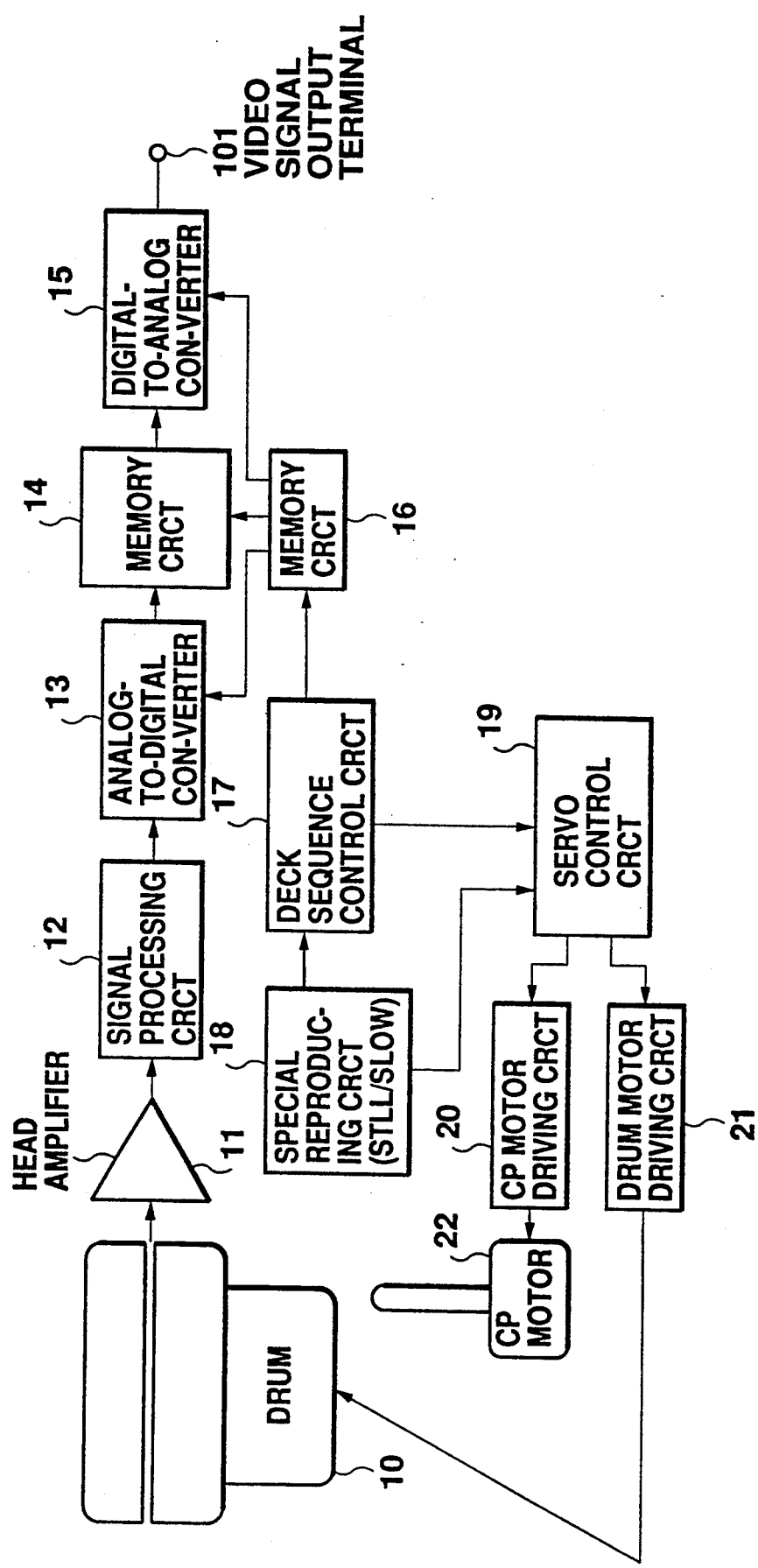
FIG. 12 is a block diagram showing the configuration of a first conventional magnetic recording and reproducing apparatus.

Description of the special reproducing facilities related to a conventional VTR shown in FIG. 12 are dispensed with because they are not directly related to this invention. This invention is applicable to a VTR having either a frame memory or field memory as shown in FIG. 12, without increasing the manufacturing cost.

As for the superimposition recording of the foregoing embodiment, the signals are recorded by the double layer recording system, i.e. recording is performed on the surface layer and a deep layer of the tape. Such a method is one of the techniques for reducing interference between the audio signals and the video signals. Unless strict requirements are made on characteristics, it is possible to adopt a superimposition reproducing system in which both of the audio and video signals are applied in a mixed manner to a pair of rotary video heads.

The memory circuit 414 and RAMs 452, 453 may be organized as one unit, and the time base compressors 454, 455 may be integrated.

As described so far, the asynchronous TV signals for a plurality of channels can be recorded on the recording medium alternately in succession. The audio signals for channels are superimposed on the recording medium. The audio signal and the video signal from a plurality of channels can be reproduced as desired. In this case, the audio signal is reproduced in an expanded manner. Therefore, this invention is advantageous in that programs broadcasted on different channels at the same time, e.g. a baseball game and a drama, can be recorded respectively by one VTR.

Figure 13:
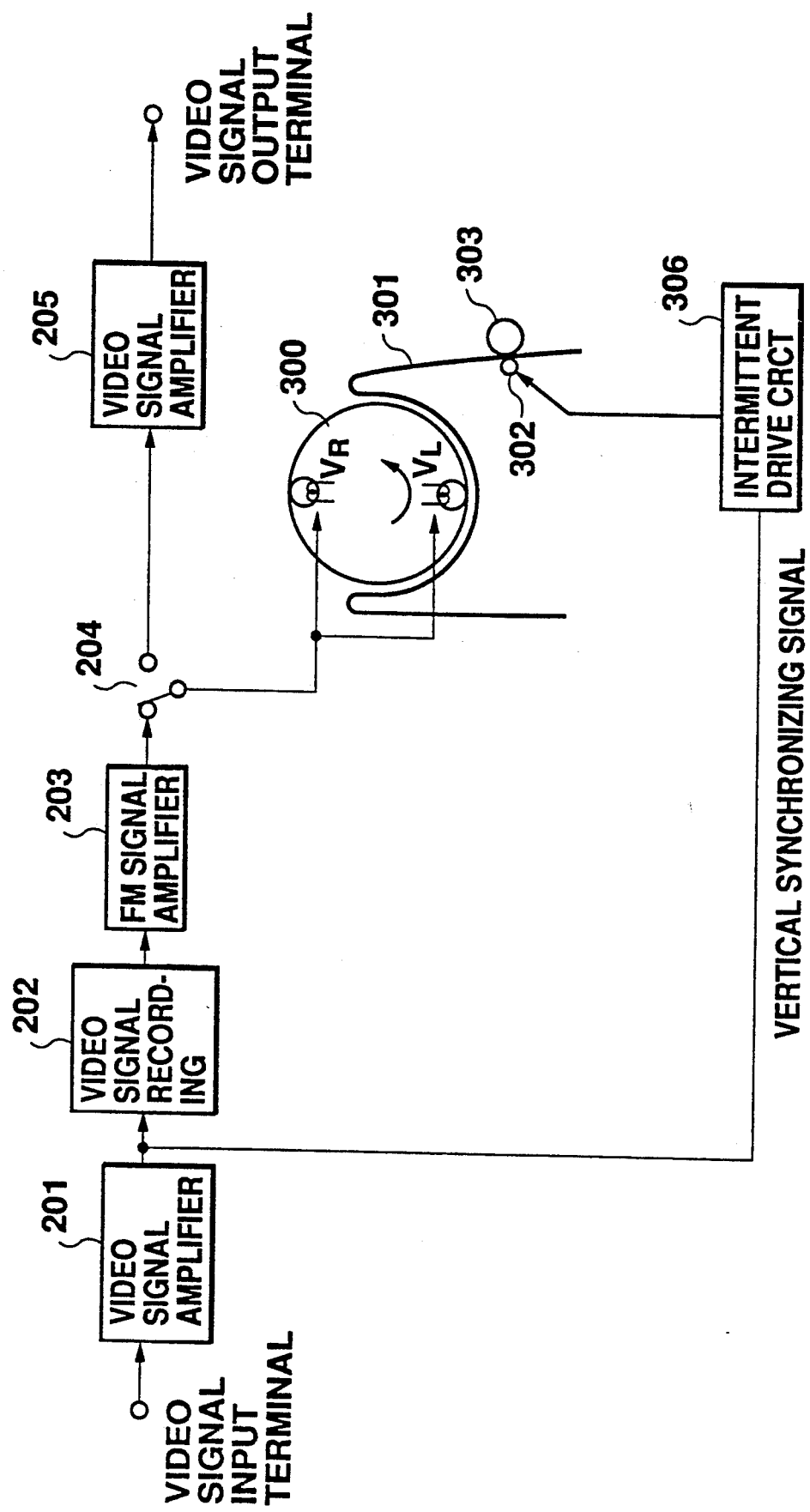
FIG. 13 is a block diagram showing a configuration of a second conventional magnetic recording and reproducing apparatus.

A second embodiment of this invention will be described with reference to FIG. 7. In this embodiment, a VTR includes circuits such as a video signal amplifier 601, a video signal reproducing circuit 602, an FM signal amplifier 603, a mode selector switch 604a, a video signal reproducing circuit 605, and an intermittent drive circuit 606, all of which are substantially identical to those shown in FIG. 13.

Audio signals are applied to an audio signal amplifier 621 from an audio signal input terminal. Reference numeral 622 stands for an 8-bit analog-to-digital converter circuit, for example, for converting analog signals into digital signals. 623 is a RAM circuit for temporarily storing the digital audio signals. 624 is a time base compressor for compressing the time base of the audio digital signals stored in RAM 623. 625 is a digital-to-analog converter for converting the compressed digital signals into analog audio signals. 626 is an FM modulator for modulating the compressed analog audio signal into an FM signal. 627 is a system clock signal generator for controlling the audio signal processing sequence.

604b, 604c and 604d are switches for selecting either the recording or reproducing mode for the audio signals. Composition and operation timings of these switches are identical to a mode selector switch 604a for the video signals.

628 is a time base expander 628 which is actuated to expand the compressed audio signals during reproducing operation. For the reproducing operation, an FM demodulator 629 demodulates the FM signal picked up by the rotary head.

An output of the digital-to-analog converter circuit 625 is sent to the audio output terminal from the audio signal output circuit 630.

Operation of the VTR of the second invention will be described with reference to FIGS. 8 to 11.

Figure 7:
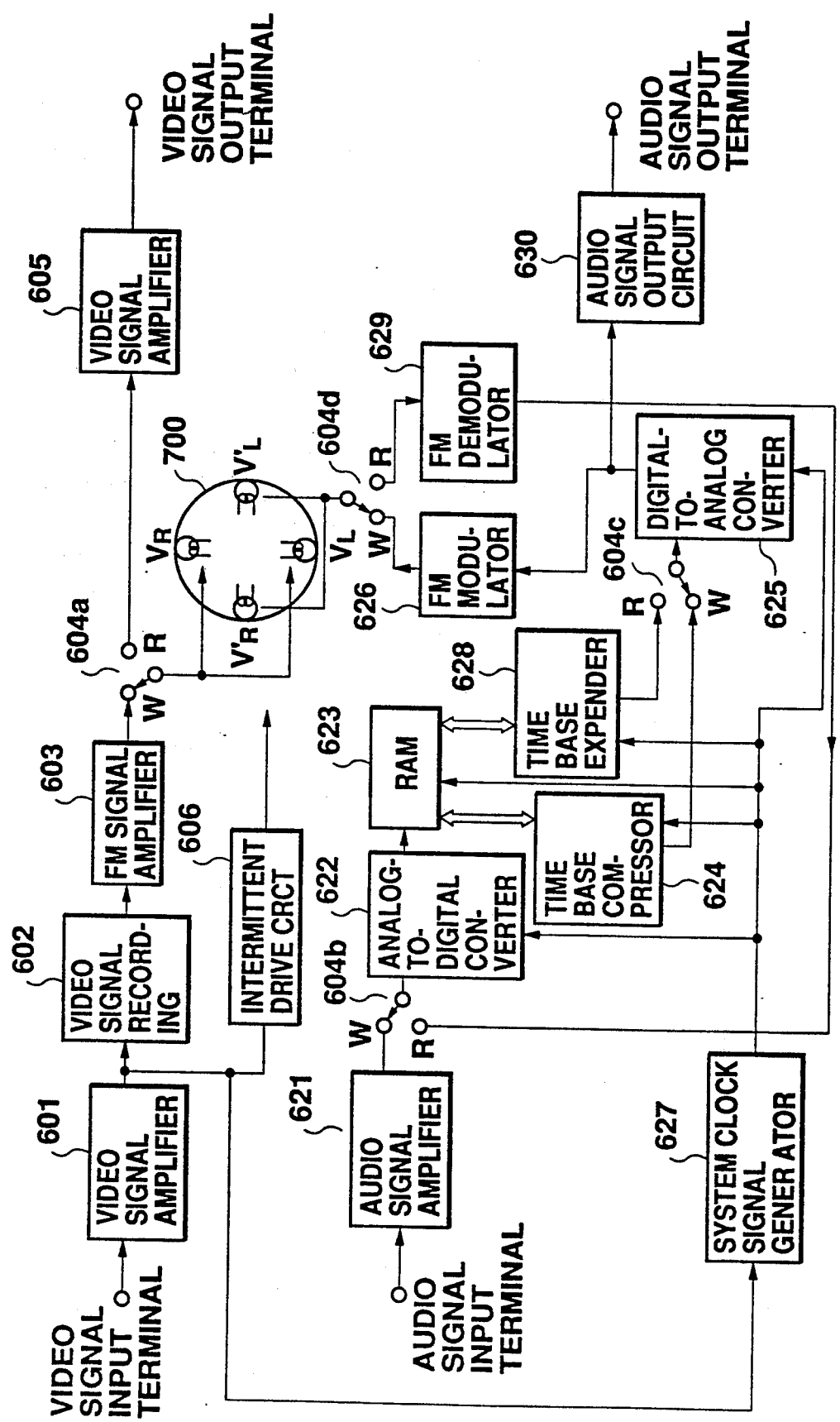
FIG. 7 is a block diagram showing the configuration of a magnetic recording and reproducing apparatus according to a second embodiment.

During the recording operation, the selector switches 604a, 604b, 604, 604d are connected to the W sides as shown in FIG. 7.

Analog audio signals amplified by the audio signal amplifier 621 are converted into digital signals by the analog-to-digital converter circuit 622 so as to be quantized.

According to the sampling theorem to express continuous analog signals by sampling them at a predetermined time interval, when sampling is performed at at least twice the maximum frequency in the signal spectrum distribution, original waveforms can be reproduced completely. In addition, the audio signals can be identified when they have a frequency of 10 KHz. In this case, a sampling frequency of 20 KHz is enough to correctly reproduce the audio signals.

Analog audio signals including frequencies up to a maximum of 10 KHz are quantized by eight bits, for example, and are written in RAM 623 by using a sampling frequency of 20 KHz.

The digital audio signals written in RAM 623 are read by using a frequency which is ten times the sampling frequency (200 KHz). This means that the signals are compressed to one tenth. The time base compressor 624 writes the foregoing digital signals into RAM 603 temporarily at a predetermined speed, reading the signals at high speed. For example, a data transmitting rate (the predetermined speed described above) is determined to be 10 KHz×8 bits=80 kbps. The 80 kbps data should be read at a tenfold speed so as to compress the time base of the data to one tenth. Specifically, the data in RAM 623 are read at a high speed of 0.8 mbps (=80 kbps×10) so as to be time-base compressed. The digital signal is applied to the digital-to-analog converter circuit 625 via the selector switch 604c, before being applied to the FM modulator circuit 626 as a time-base-compressed analog signal to be modulated and amplified. The signal is then forwarded to deep layer reproducing heads VR', VL' via the mode selector switch 604d, to be recorded on the magnetic tape.

The system clock signal generator 627 controls the timing of the digital circuits, producing clock signals based on the synchronizing signals in the video signals and the burst signals in the chromatic signals.

Figure 8:
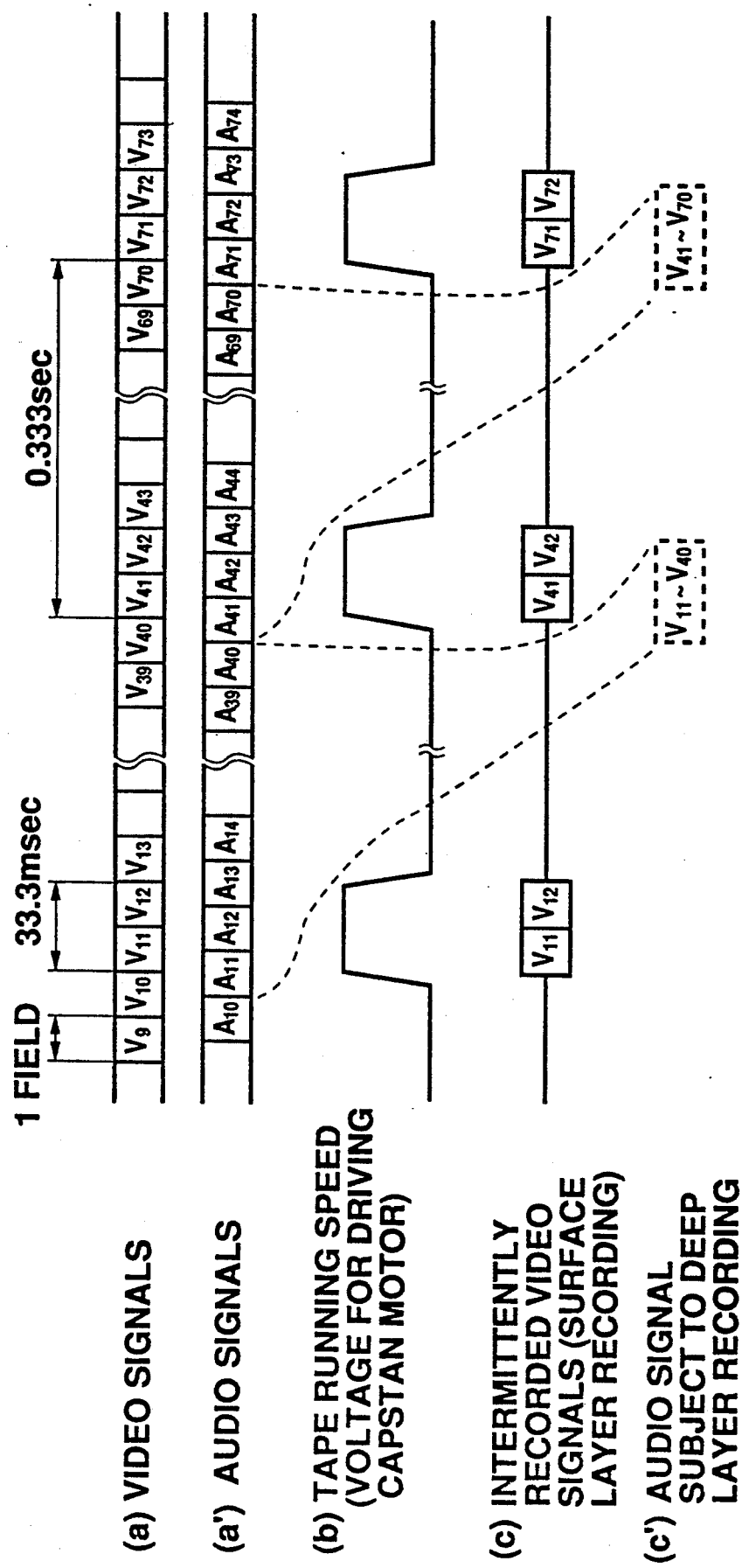
FIG. 8 is a timing chart showing reproduction timings in the apparatus of the second embodiment.

As shown at (a) in FIG. 8, the video signals $V_0$, $V_1$, ... are sent for every field, from a TV camera, in succession based on vertical synchronization signals.

As shown at (a') in FIG. 8, the audio signals $A_0$, $A_1$, ... are sent successively and continuously from a microphone, for example. No reference signals are available for the audio signals. For simplification the audio signals are named as $A_0$, $A_1$, ... to show time frames similarly to the video signals. In an ordinary continuous recording VTR, a magnetic tape is fed at a constant speed so that the video signals $V_0$, $V_1$, ... are recorded slantways by a rotary video head in succession, while the audio signals $A_0$, $A_1$, ... are recorded continuously at an upper 1-mm width portion of the magnetic tape by the stationary linear audio head.

Figure 14:
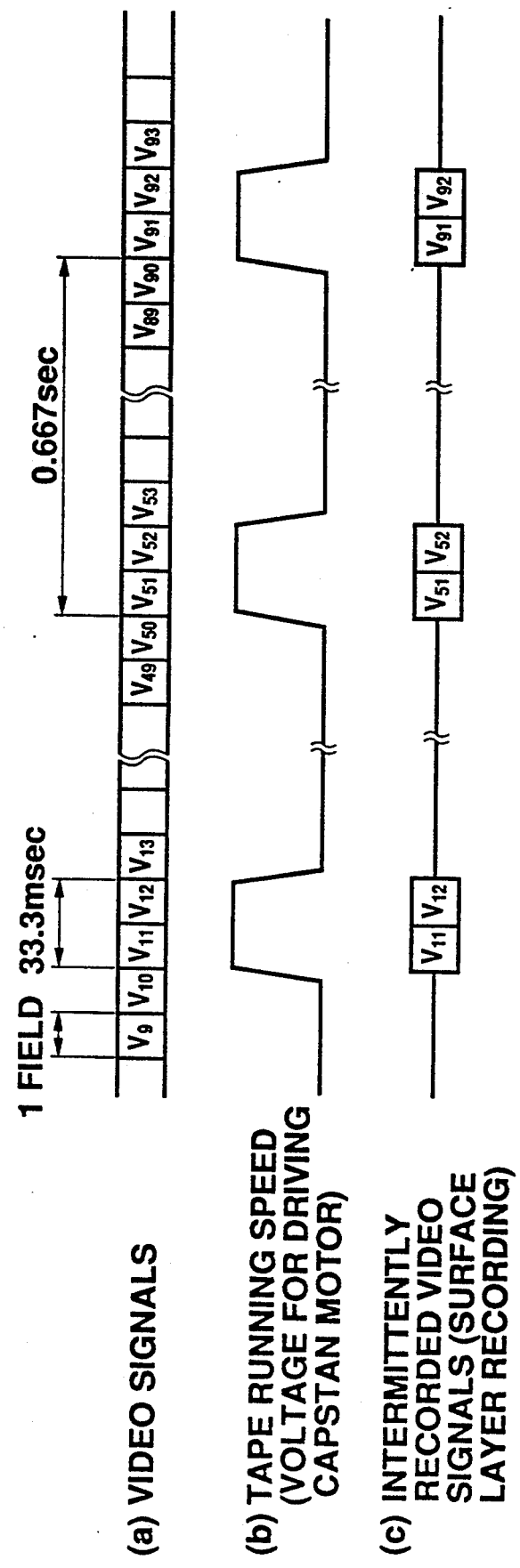
FIG. 14 is a timing chart showing timings for intermittent recording in the second conventional apparatus.
Figure 15:
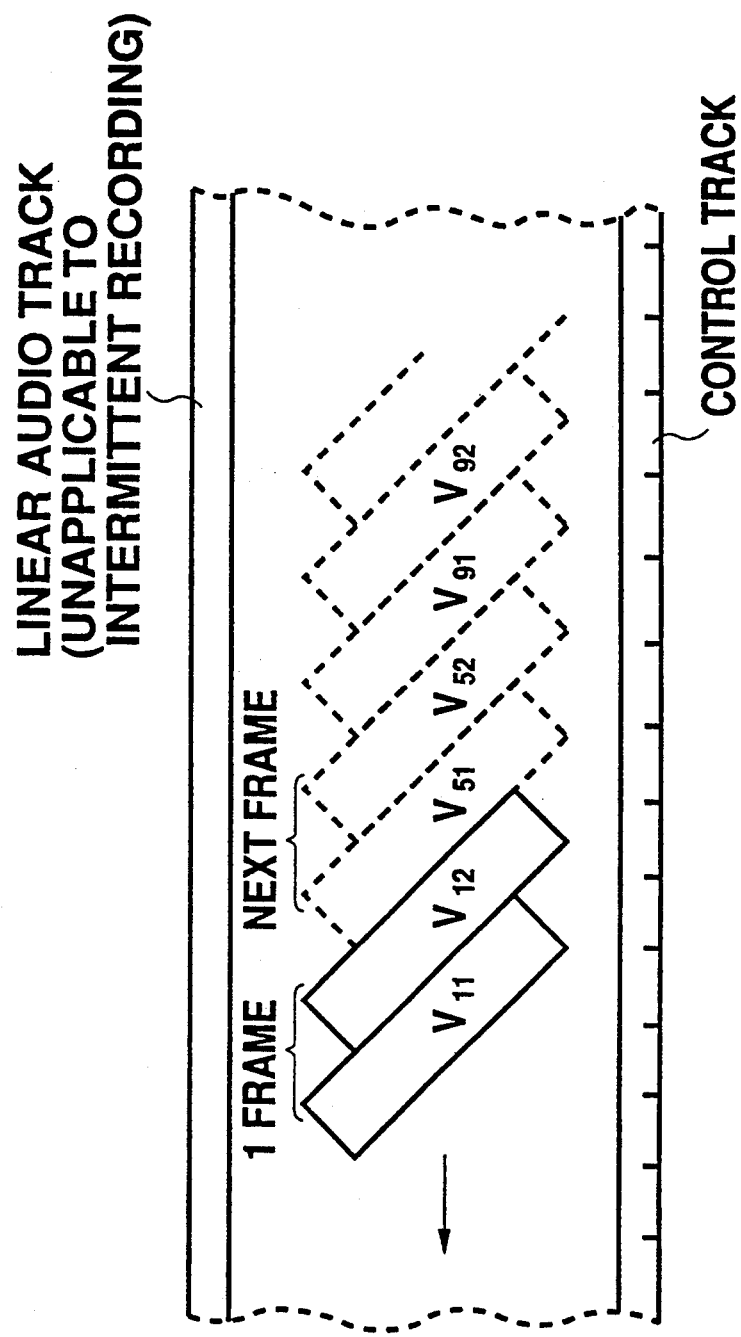
FIG. 15 is a top plan view showing details of intermittent recording in the second conventional apparatus.

As described with respect to the intermittent recording VTR of FIG. 14, since the running speed of the magnetic tape is stepped as shown at (b) in FIG. 8, only the field (or frame) of the video signal which is selected during the running of the tape is recorded. Firstly, the consecutive analog audio signals $A_{11}$ to $A_{40}$ lasting for 0.333 seconds are converted into digital signals as mentioned above, subjected to the time base compression, and are stored in RAM 623 as shown by broken lines at (c') in FIG. 8. All of the data in the audio signals ($A_{11}$, $A_{12}$ to $A_{39}$, $A_{40}$), ($A_{41}$, $A_{42}$ to $A_{69}$, $A_{70}$), ... are compressed.

During 0.333 seconds of the consecutive video signals $V_{11}$ to $V_{41}$, only the fields for the video signals $V_{41}$, $V_{42}$ are selected.

Figure 9A:
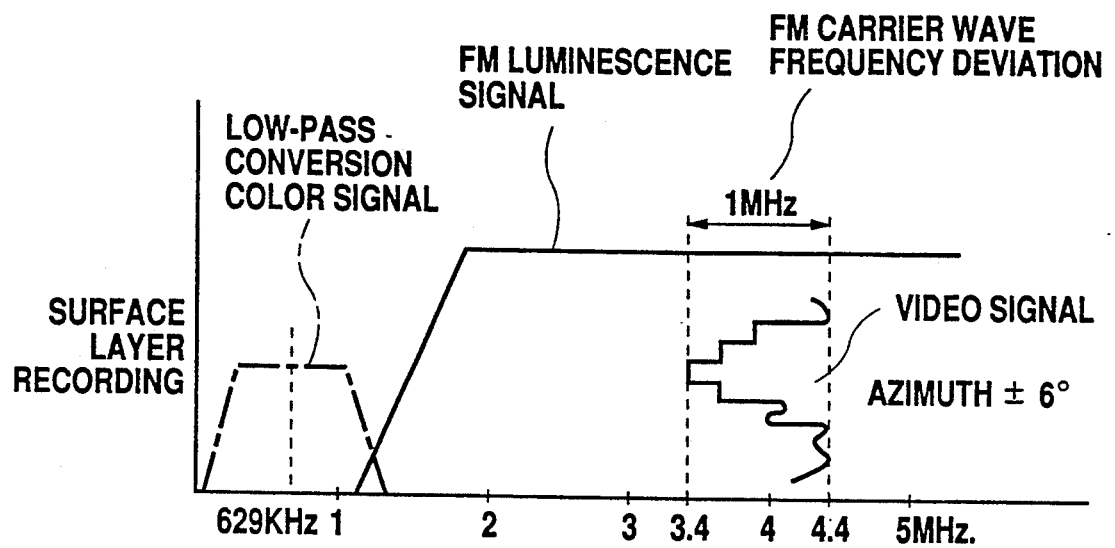
FIG. 9A shows details of surface layer reproducing in the apparatus of the second embodiment.
Figure 9B:
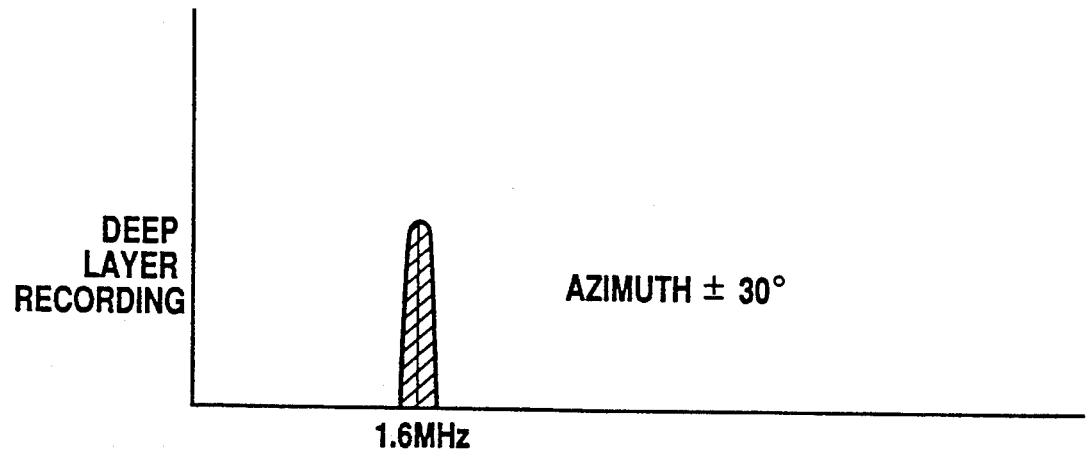
FIG. 9B shows details of deep layer recording in the apparatus of the second embodiment.

Both the above signals are applied to the rotary heads VR, VL, VR', VL', respectively. The video signals have frequencies as shown in FIG. 9A. The luminescence signal is subject to the FM frequency modulation, while the chromatic signals are subject to the low-pass conversion color recording system. The audio signals are subject to the FM modulation at a frequency shown in FIG. 9B. The heads VR, VL for the video signals are provided on the rotary drum 700, having a narrow gap (0.25 μm) and an azimuth angle of plus/minus 6°. The heads VR', VL' for the digital audio signals have a large gap (1.0 μm) and an azimuth angle of plus/minus 30°.

Figure 10:
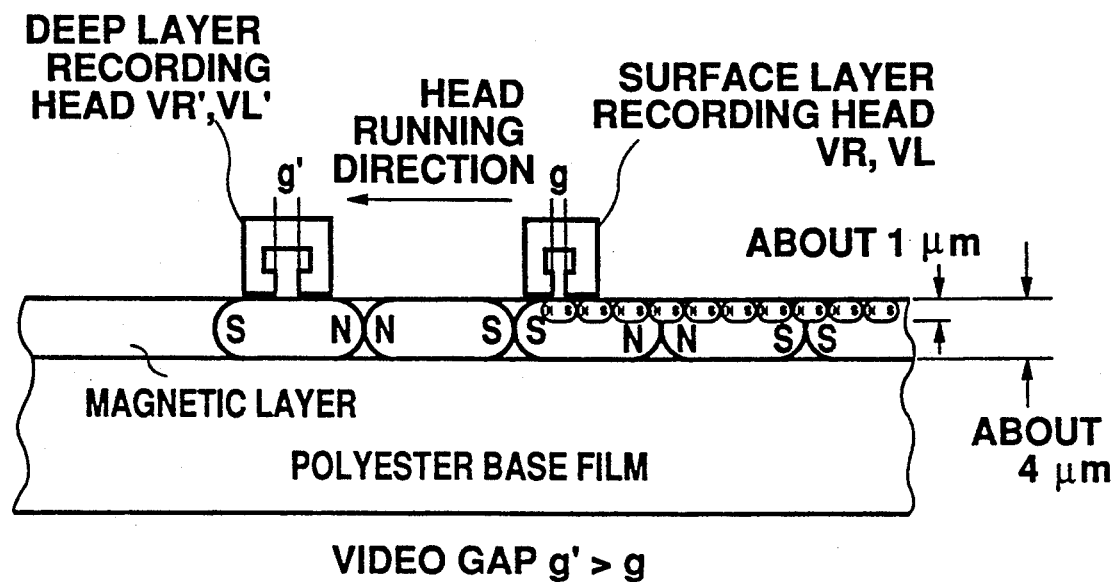
FIG. 10 a cross sectional view showing details of double layer recording in the apparatus of the second embodiment.

The audio signals, which are shown by broken lines (at (c') in FIG. 8) and have been subject to the time base compression and to FM modulation, are recorded firstly by the deep layer recording heads VR', V'L as shown in FIG. 10. Secondly, the video signals for the selected field are recorded over the audio signals by using the surface layer recording heads VR, VL. Since the heads VR and VL and the heads VR', VL' have gaps of different widths and different azimuth angles, they seldom interfere with each other. No problems will be caused.

Figure 11:
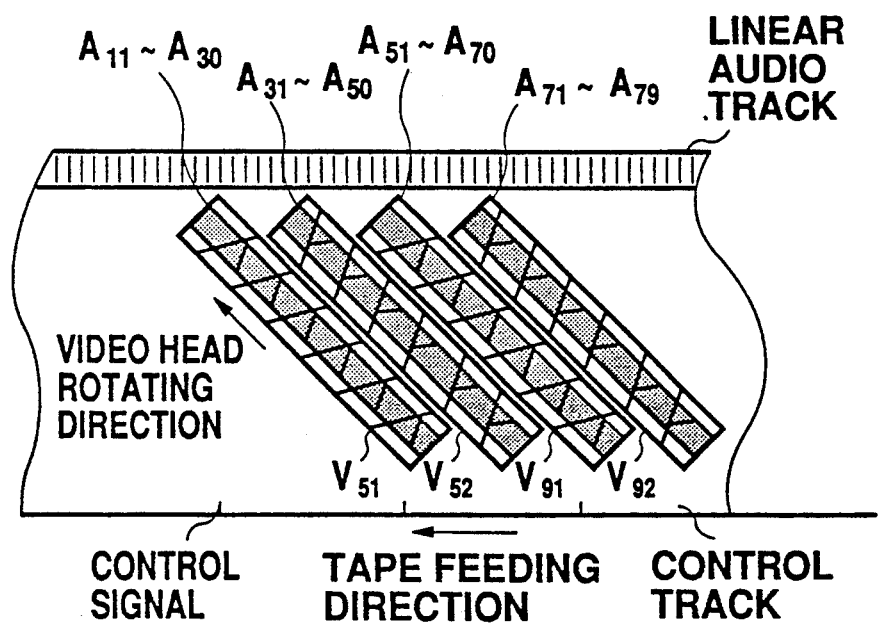
FIG. 11 is a top plan view showing details of double layer reproducing in the apparatus of the second embodiment.

FIG. 11 is a top plan view of the magnetic tape, in which the signals are written twice by the two heads in one track in the direction of thickness of the tape.

Operation of the components related with the reproducing function will be described by assuming that the selector switches 604a, 604b, 604c, 604d have been set to the side R.

The magnetic tape, on which the time-base-compressed audio signals have been recorded in the deep layer and the video FM modulated signals and low-pass conversion color signals have been recorded in the surface layer, is reproduced by the rotary heads, VR, VL, VR', VL'.

Firstly, the video FM signals and low-pass conversion color signals, which have been recorded on the surface layer of the tape, are applied to the video signal reproducing circuit 605 via the selector switch 604a. The video signal applied to the video signal reproducing circuit 605 is demodulated, while the color signals are returned to signals having a high frequency. These signals are mixed to serve as the video output signal.

The audio FM signals after the deep layer recording are applied to the FM demodulator 629 via the selector switch 604d, are demodulated into compressed analog audio signals, and are applied to the analog-to-digital converter circuit 622 via the selector switch 604b so as to be converted into digital audio signals, which are stored in RAM 623. The digital audio signals stored in RAM 623 are recalled at a predetermined speed by the time base expander 628, before being applied to the digital-to-analog converter 625 via the selector switch 604c so as to obtain analog audio signals. The analog audio signals are amplified by the audio signal output circuit 630, and are converted into low impedance signals, which will then be outputted.

Although the foregoing embodiments have been described by exemplifying specific numerical values, this invention is not limited to those numerical values. A variety of techniques are conceivable to compress the time base of the digital audio signals. The more extensively the signals are compressed, the longer the intermittent period can be established. In addition, the higher the frequency of recall clock signal of RAM 623, the longer the intermittent period can be selected. It should however be noted that if the frequency of the clock signal gets close to the frequency of the FM modulation frequency, these signals will tend to interfere with one another.

Quality of sound is slightly deteriorated because the number of bits is decreased and the time base is compressed. This inconvenience can be prevented by disposing a noise reduction circuit in front of the audio signal amplifier 621 or between the amplifier 621 and the analog-to-digital converter 622 so as to improve the signal-to-noise (SN) ratio.

Although no error correcting code circuit is required fundamentally for the VTR of this invention, it may be provided to improve reliability. However, when the digital circuits 622, 623, 624, 628, 625 are used for the bit quantity conversion for the purpose of lengthening the operation period or simplifying the operation, the error correcting code circuit will be indispensable.

According to this invention, the audio signals are subject to the deep layer recording while the video signals are subject to the surface layer recording (based on the VHS system) so that both of these signals do not interfere with one another. The video and audio may be recorded by means of the β-system HiFi, in which a pair of heads are used to mix the FM video signals and the time-base-compressed FM audio signals. In addition, it is possible that one field video track is divided into an FM video signal area and a time-base-compressed FM audio signal area as with the 8-mm system PCM.

As appears from the foregoing, the analog audio signals arriving continuously undergo analog-to-digital conversion, time base compression (or expansion), digital-to-analog conversion and FM modulation, and are recorded (or reproduced) on the deep layer of the magnetic tape. The video signals in the fields (or frames) picked up intermittently are recorded (or reproduced) on the surface layer over the deep layer where the audio signals have already been recorded. As as result, the VTRs according to this invention allow continuous reproducing of voices which have been recorded intermittently, are able to provide both the video and audio data over a long period of time, and are advantageously applicable as monitor VTRs for the prevention of crime.

What is claimed is:

1. A magnetic recording and reproducing apparatus comprising:
    analog-to-digital means for converting audio signals for a plurality of different channels into digital data, said different channels having timing offset from each other;
    memory means for storing data outputted from said analog-to-digital means so as to synchronize the digital data for a plurality of different channels;
    time base compressing means for compressing a time base of the data stored in said memory means and for outputting time-base-compressed data;
    digital-to-analog converter means for converting the time-base-compressed data outputted from said time base compressing means into analog signals and for outputting analog time-base-compressed audio signals;
    an audio signal recorder for recording the analog time-base-compressed audio signals at a first layer of a magnetic recording medium so that audio signals for a plurality of different channels being produced simultaneously can be subsequently reproduced continuously to produce sounds without interruption; and
    a video signal recorder for superimposing video signals from different channels being produced at different timings for each channel at a second layer of the magnetic recording medium, said second layer being over the first layer where the analog time-base-compressed audio signals have been recorded, thereby providing recording of two simultaneously broadcasted programs on the same magnetic recording medium.

2. A magnetic recording and reproducing apparatus comprising:
    input means for inputting television signals including audio signals and video signals for a plurality of different channels;
    first analog-to-digital converter means for converting the video signals inputted from said input means into video digital data and for outputting the video digital data;
    second analog-to-digital converter means for converting the audio signals inputted respectively from said input means into audio digital data;
    memory means for storing the video digital data outputted from said first analog-to-digital converter means and the audio digital data outputted from said second analog-to-digital converter means, said memory means including a first memory for storing and synchronizing respective channels of the video digital data and a second memory for storing and synchronizing respective channels of the audio digital data;

first digital-to-analog converter means for converting the video digital data stored in said memory means into video analog signals and for outputting the video analog signals;

time base compressing means for compressing a time base of the audio digital data stored in said memory means and for outputting time-base-compressed data;

second digital-to-analog converter means for converting data outputted from said time base compressor means into audio analog signals and for outputting the audio analog signals as analog time-base-compressed audio signals;

audio data supply control means for controlling the timing for said time base compressor means to supply the time-based-compressed data to said second digital-to-analog converter means so that data corresponding to the audio and video signals inputted from said input means are incorporated alternately into the time-base-compressed audio analog signals outputted from said second digital-to-analog converter means;

an audio signal recorder for recording the analog time-base-compressed audio signals at a first layer of a magnetic recording medium so that audio signals for a plurality of different channels can be subsequently reproduced to produce audio signals without interruption;

a video signal recorder for superimposing video signals from said first digital-to-analog converter means and one video signal not inputted to said first analog-to-digital converter means at a second layer of the magnetic recording medium, said second layer being over said first layer of the magnetic recording medium; and video signal supply control means for supplying video signals from different channels alternately at a predetermined timing so as to have video signals from different channels recorded by said video signal recorder.

3. The magnetic recording and reproducing apparatus according to claim 2, wherein said time base compressor means comprises:

a plurality of time base compressor units for the audio signals, said plurality of time base compressor units being adapted to compress the time base of the data stored in said second memory of the memory means.

4. The magnetic recording and reproducing apparatus according to claim 2, wherein said audio signal recorder records the time-base-compressed audio analog signals on the magnetic recording medium at a predetermined depth thereof; and said video signal recorder recording video signals outputted from said first digital-to-analog converter means and one video signal not inputted to said first analog-to-digital converter means at a different depth of the magnetic recording medium over the area having time-base-compressed audio analog signals recorded therein.

5. The magnetic recording and reproducing apparatus according to claim 2, wherein said audio signal recorder records the time-base-compressed analog audio signals on the recording medium at a predetermined depth from a surface thereof and said video signal recorder records the video signals on the surface of the magnetic recording medium in an area over the area where said audio signal recorder has recorded the time-base-compressed audio analog signals.

6. The magnetic recording and reproducing apparatus according to claim 2, further comprising:

a video signal reproducer for reproducing a plurality of video signals stored on the magnetic recording medium;

a video signal selector for selecting one of the reproduced video signals and outputting the selected signal as a reproduced video signal;

an audio signal reproducer for reproducing the time-base-compressed audio analog signals stored on the magnetic recording medium;

an audio signal selector for selecting one of the time-base-compressed audio analog signals and for outputting the selected time-base-compressed audio analog signal to said second analog-to-digital converter means; and time base expander for expanding the time base of data stored in said memory means and for outputting expanded data to said second digital-to-analog converter means;

said second digital-to-analog converter means being adapted to convert the data outputted from said time base expander into analog signals and to output reproduced audio signals.

7. The magnetic recording and reproducing apparatus according to claim 6, wherein said memory means comprises:

a first memory for storing data outputted from said first analog-to-digital converter means; and second memory for storing data outputted from said second analog-to-digital converter means.

8. The magnetic recording and reproducing apparatus according to claim 7, wherein said time base compressor means includes a plurality of time base compressor units so as to compress the time base of the data stored in said second memory of the memory means.

9. The magnetic recording and reproducing apparatus according to claim 6, wherein said audio signal recorder is adapted to record the time-base-compressed audio analog signals on the magnetic recording medium in an area at a predetermined depth thereof and said video signal recorder is adapted to record video signals outputted from said first digital-to-analog converter means and one video signal not inputted to said first analog-to-digital converter means at a different depth of the magnetic recording medium.

10. The magnetic recording and reproducing apparatus according to claim 6, wherein said audio signal recorder is adapted to record the time-base-compressed audio analog signals on the magnetic recording medium in an area at a predetermined depth from a surface thereof and said video signal recorder is adapted to record the video signals on the surface of the magnetic recording medium in an area over the area where the time-base-compressed audio analog signals have been recorded by said audio signal recorder.

11. The magnetic recording and reproducing apparatus according to claim 6, wherein said first analog-to-digital converter means is adapted to fetch the video signals outputted from said video signal selectors.

12. The magnetic recording and reproducing apparatus according to claim 11, wherein said memory means comprises:

first memory means for storing data outputted from said first analog-to-digital converter means; and second memory for storing data outputted from said second analog-to-digital converter means.

13. The magnetic recording and reproducing apparatus according to claim 12, wherein said time base compressor includes a plurality of time base compressing units for compressing the time base of the data stored in said second memory of the memory means and outputting the time-base-compressed data.

14. The magnetic recording and reproducing apparatus according to claim 12, wherein said audio signal recorder records the time-base-compressed audio analog signals on the magnetic recording medium in an area at a predetermined depth from a surface thereof and said video signal recorder records the video signals on the surface of the magnetic recording medium in an area over the area where the time-base-compressed audio analog signals have been recorded by said audio signal recorder.

* * * * *